(12) United States Patent
Wijnands et al.

(10) Patent No.: US 8,391,185 B2
(45) Date of Patent: Mar. 5, 2013

(54) METHOD TO TRANSPORT BIDIR PIM OVER A MULTIPROTOCOL LABEL SWITCHED NETWORK

(75) Inventors: Jacob Ijsbrand Wijnands, Leuven (BE); Arjen Boers, Sitges (ES)

(73) Assignee: Cisco Technology, Inc., San Jose, CA (US)

( * ) Notice: Subject to any disclaimer, the term of this patent is extended or adjusted under 35 U.S.C. 154(b) by 250 days.

(21) Appl. No.: 12/126,424

(22) Filed: May 23, 2008

(65) Prior Publication Data

US 2008/0298360 A1 Dec. 4, 2008

Related U.S. Application Data

(60) Provisional application No. 60/932,358, filed on May 29, 2007.

(51) Int. Cl.
*H04L 12/28* (2006.01)
*H04L 12/56* (2006.01)
(52) U.S. Cl. .................. 370/256; 370/390
(58) Field of Classification Search .......... None
See application file for complete search history.

(56) References Cited

U.S. PATENT DOCUMENTS

| | | | | |
|---|---|---|---|---|
| 6,879,594 B1* | 4/2005 | Lee et al. | | 370/408 |
| 7,120,118 B2* | 10/2006 | Rajagopal et al. | | 370/237 |
| 7,522,599 B1* | 4/2009 | Aggarwal et al. | | 370/390 |
| 7,564,803 B1* | 7/2009 | Minei et al. | | 370/254 |
| 7,738,359 B1* | 6/2010 | Suryaputra et al. | | 370/216 |
| 7,933,267 B1* | 4/2011 | Aggarwal et al. | | 370/389 |
| 2005/0050220 A1* | 3/2005 | Rouyer et al. | | 709/232 |
| 2005/0152289 A1* | 7/2005 | Nagata et al. | | 370/256 |
| 2006/0133286 A1* | 6/2006 | Elie-Dit-Cosaque et al. | | 370/249 |
| 2006/0193332 A1* | 8/2006 | Qian et al. | | 370/397 |
| 2006/0221867 A1* | 10/2006 | Wijnands et al. | | 370/255 |
| 2006/0221958 A1* | 10/2006 | Wijnands et al. | | 370/389 |
| 2007/0091891 A1* | 4/2007 | Zwiebel et al. | | 370/390 |
| 2007/0104194 A1* | 5/2007 | Wijnands et al. | | 370/390 |
| 2008/0123650 A1* | 5/2008 | Bhaskar | | 370/392 |
| 2009/0182896 A1* | 7/2009 | Patterson et al. | | 709/241 |
| 2009/0232031 A1* | 9/2009 | Vasseur et al. | | 370/256 |
| 2009/0274153 A1* | 11/2009 | Kuo et al. | | 370/392 |
| 2010/0054157 A1* | 3/2010 | Farkas et al. | | 370/256 |

OTHER PUBLICATIONS

Handley et al. "Bi-directional Protocol Independent Multicast (BIDIR-PIM)". draft-ietf-pim-bidir-08. IETF. Oct. 22, 2005. pp. 1-46.*

* cited by examiner

*Primary Examiner* — John Blanton
*Assistant Examiner* — Andrew Oh
(74) *Attorney, Agent, or Firm* — Schwegman, Lundberg & Woessner, P.A.

(57) ABSTRACT

A method, system and an apparatus to transport bidir PIM over a multiprotocol label switched network are provided. The method may comprise receiving a multicast packet at a network element, the multicast packet including an upstream label. The method may further comprise identifying, from the upstream label, a Multicast Distribution Tree (MDT) rooted at a rendezvous point. The packet may be forwarded along the MDT towards the RP based on the upstream label. The MDT may be identified from a downstream label and the packet may be forwarded along the MDT away from the RP based on the downstream label.

21 Claims, 10 Drawing Sheets

METHOD TO TRANSPORT BIDIR PIM OVER A MULTIPROTOCOL LABEL SWITCHED NETWORK

CROSS REFERENCE TO RELATED APPLICATIONS

This is a non-provisional patent application claiming priority under 35 USC §119(e) to U.S. Provisional Patent Application No. 60/932,358 filed on May 29, 2007, entitled "METHOD TO TRANSPORT BIDIR PIM OVER A MULTIPROTOCOL LABEL SWITCHED NETWORK", which is incorporated by reference in its entirety.

FIELD

The present disclosure relates generally to multicast routing using, for example, bidirectional Protocol Independent Multicast (PIM).

BACKGROUND

In certain circumstances data must be sent over a network to multiple receiver devices (e.g., video content, video/telephone conferencing applications etc.). Communications (e.g., packets) that are sent from a source to multiple receivers may be referred to as a multipoint communication or multicast. An example of a protocol to perform multicasting is PIM.

BRIEF DESCRIPTION OF DRAWINGS

Example embodiments are illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth to provide a thorough understanding of example embodiments. It will be evident, however, to one skilled in the art that the present embodiments or other embodiments may be practiced without these specific details.

Overview

A method, system and an apparatus to transport bidir PIM over a multiprotocol label switched network are provided. The method may comprise receiving a multicast packet at a network element, the multicast packet including an upstream label. The method may further comprise identifying, from the upstream label, a Multicast Distribution Tree (MDT) rooted at a rendezvous point. The packet may be forwarded along the MDT towards the RP based on the upstream label. The MDT may be identified from a downstream label and the packet may be forwarded along the MDT away from the RP based on the downstream label.

Example Embodiments

Example embodiments may create, maintain, and use multipoint-to-multipoint LSPs in a provider network in conjunction with a protocol such as Multiprotocol Label Switching (MPLS). The LSPs allow bidir PIM transmission between network router elements in a core of a provider network. The network router elements may be configured to use bidir PIM without electing a designated forwarder (DF) to communicate packets to a rendezvous point (RP).

In an example embodiment, a method, device and system are provided for transporting bidir PIM over an MPLS network. Packets (or datagrams) may be transported from a RP using bidir PIM and an LSP. Accordingly, in an example embodiment, instead of electing routers as DFs, as is essential in bidir PIM, segmented Multicast Distribution Trees (MDT) are provided to forward packets upstream towards the RP. Thus, in an example embodiment, election of DFs to forward bidir PIM packets may be eliminated.

An MDT may comprise a LSP rooted at each ingress provider edge router element in a network. In an example embodiment, the MDT tree may span between a source and a RP to form a segmented MDT. Multiple Virtual Private Networks (VPNs) may, optionally, be aggregated over a segmented MDT tree wherein each ingress provider edge router element allocates a label per VPN. Thus, the allocated "upstream" label may be unique in the context of the segmented MDT. In an example embodiment, the segmented MDT may be point-to-multipoint point (P2MP) or multipoint-to-multipoint (MP2MP) LSP.

Figure 1:
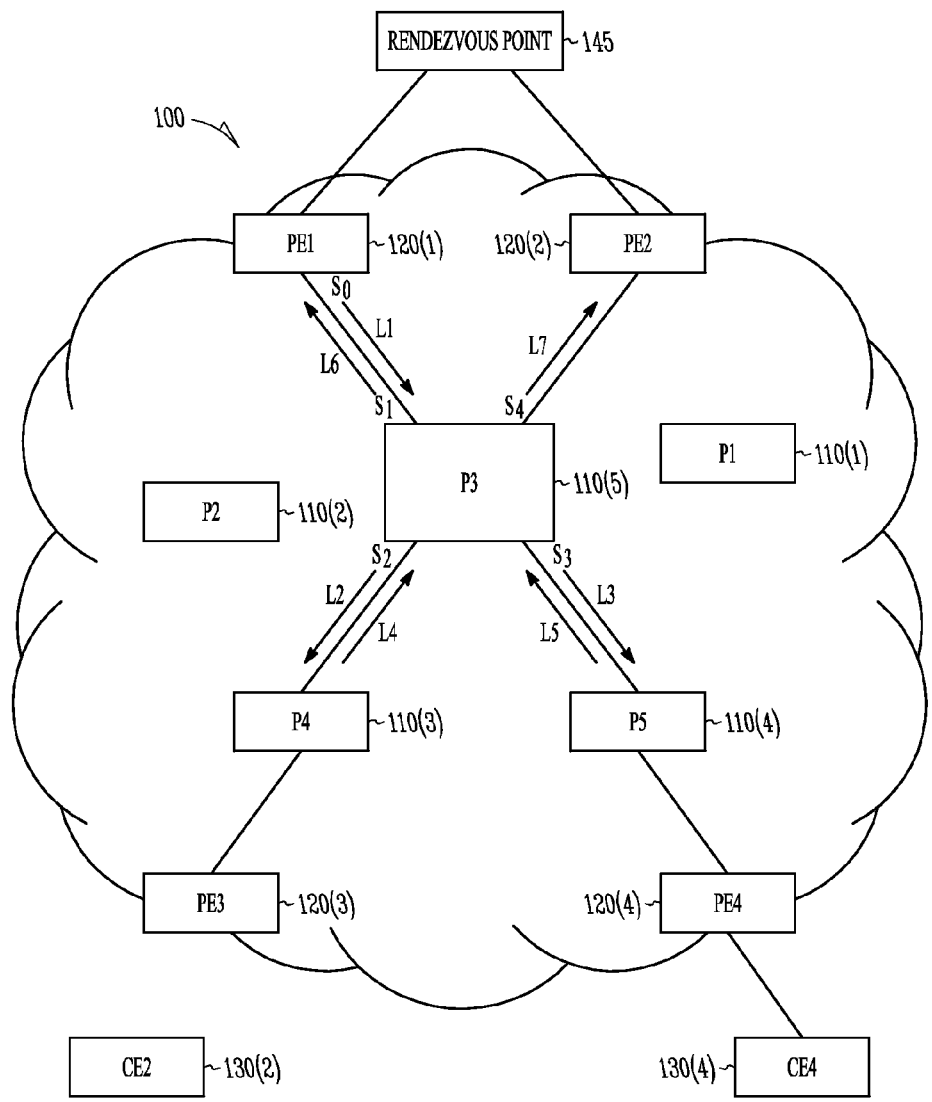
FIG. 1 shows network router elements in a Multiprotocol Label Switched (MPLS) provider network, in accordance with an example embodiment.

FIG. 1 shows a block diagram of network router elements in a provider network 100 in accordance with an example embodiment. Such a provider network 100 can utilize MPLS protocol to improve data transmission speeds within the core of the provider network 100. The provider network 100 includes core network router elements (P) 110(1)-110(5). For ease of explanation, example embodiments are described with reference to network elements 110(3)-110(5). The provider network 100 further includes edge router elements (PE) 120(1)-120(4). The edge router elements 120(1)-120 (4) can be connected to customer network router elements (e.g., routers elements 130(2) and 130(4)) to allow ingress and egress of data streams to the provider network 100. The example core network router elements 110(1)-110(5) and edge router elements 120(1-4) are physically coupled to permit the transmission of packets from any edge router element 120(1)-120(4)

to any other edge router element 120(1)-120 (4) using a multicast protocol such as bidir PIM.

Bidir PIM

An example of multicast routing protocol is PIM. Routers use PIM to make forwarding decisions. PIM determines the shortest path for each multicast group based on an IP routing protocol running on the router (such as Enhanced Interior Gateway Routing Protocol (EIGRP), or Open Shortest Path First (OSPF)). Using Reverse Path Forwarding (RPF), routers use an existing unicast routing table to determine upstream and downstream neighbors.

The family of PIM protocols includes dense-mode, sparse-mode, source specific multicast (SSM), and bidir PIM. Bidir PIM facilitates deploying applications that rely on multi-point-to-multipoint applications. Bidir PIM enables these applications by allowing them to easily scale to a very large number of groups and sources by eliminating the maintenance of source state.

Bidir PIM uses shared trees to send data to a common point in the network (known as the rendezvous point (RP)) prior to sending it to each receiver. Because bidir PIM only uses shared trees for traffic distribution, this protocol needs a mechanism to get traffic from sources to the RP. A Designated Forwarder (DF) is a router that provides that mechanism. The main responsibility of the DF is to decide what packets need to be forwarded upstream toward the rendezvous point to avoid looping.

In circumstances where a host is both a source and receiver, traffic originating from that host will be traveling against the direction of the shared tree. This breaks the original assumption that shared trees only accept traffic on their Reverse Path Forwarding (RPF) interface to the RP. The same shared tree is now used to distribute traffic from the RP to receiver devices and from the sources to the RP, resulting in a bidirectional branch. This assumes that for sources which are also receivers, the upstream traffic (from the source to the RP) will follow the same network path as the downstream traffic (from the RP to the receiver). In the ultimate case where all the hosts are sources and receivers, as is the case with multipoint-to-multipoint applications, the whole distribution tree becomes a bidirectional tree.

Thus, essential to operation of bidir PIM is the election of the DFs in the network. To elect a DF, all the PIM neighbors in a subnet advertise their unicast route to the RP and the router with the best route is elected as the DF. This effectively builds a shortest path between every subnet and the RP without consuming any multicast routing state (no (S, G) entries are generated). The DF election mechanism expects all of the PIM neighbors to be bidir PIM enabled. In the case where one of more of the neighbors is not a bidir PIM capable router, the election fails and bidir PIM is disabled in that subnet. In Bidir PIM, a DF may be selected for every RP of each corresponding bidirectional group. As a result, multiple router elements may be elected as a DF on any network segment, one for each RP. In addition, any particular router element may be elected as DF on more than one interface. Routing of packets in a multicast network is based on an Internet Protocol (IP) multicast address and multicast tables provided in each router element.

As mentioned above, in an example embodiment, segmented MDTs utilizing LSPs are provided to forward packets upstream towards the RP. Thus, in an example embodiment, election of DFs to forward bidir PIM packets in a network may be avoided.

Combining LSPs and bidir PIM

In a multipoint-to-multipoint LSP, data streams flow "downstream" from a source device to a group of receiver devices and also "upstream" from each receiver device acting as a source to each other receiver device. Similar to bi-directional multicast, in order to permit upstream data flow, an LSP root address must be established. In the provider network 100 a LSP root may be provided at each ingress provider router element 120(1)-120(4). In FIG. 1 only a single multipoint-to-multipoint LSP is shown that is rooted at edge router element 120(1). Thus, in an example embodiment the root of the LSP is not provided within the core of the provider network 100. Each network router element 110(1)-110(5) may be configured to find a path to the root address. In FIG. 1, the edge router element 120(1) is shown by way of example to correspond to the root address of the multipoint-to-multipoint LSP tree. It will however be appreciated that many other router elements, both core and provider edge, may be provided and that any one or more provider edge router elements may define the root of a different LSP tree. From the perspective of each non-source edge router element and each intermediate core network router element (e.g. elements 120(4), 110(4), and 110(5)), the root network router element is always considered to be in the upstream direction.

In an example embodiment, packets transmitted using bidir PIM over the multipoint-to-multipoint LSP tree are directed to a provider edge router element where an associated LSP is rooted, and behind which the RP is provided, based on identification of an upstream label. In an example embodiment, a plurality of upstream labels may be provided wherein each upstream label identifies a VPN. Thus, in an example embodiment, a segmented MDT may be provided for each VPN where the MDT is rooted at an associated provider edge router element. In an example embodiment, an upstream assigned VPN label is not used as top label, but only as second label in a label stack to provide the VPN context for a packet. Accordingly, an upstream label for a multipoint-to-multipoint LSP may be the label used to send a packet upstream with respect to the location of the root of the multipoint-to-multipoint LSP. This label may be the top label in the packet and be assigned downstream ('downstream assigned') by an upstream router.

In an example embodiment, one downstream state and multiple upstream states may be created in the edge router elements 120(1)-120(4), acting as label switched routers, to allow forwarding based on labels in label switching. The number of upstream states may be dependent on the number of downstream interfaces. In an example embodiment, the number of upstream states is the same as the number of outgoing interfaces. Example upstream states are now described by way of example with reference to the edge router element 120(1). It is however to be appreciated that the same functionality may apply to edge router elements 120(2)-120 (4).

Building an Example LSP to Route Bidir PIM

In forming an example multipoint-to-multipoint LSP, the network router element 110(3) may send a label mapping to the network router element 110(5), and inform network router element 110(5) to use a label L2 on interface S2 for downstream traffic (toward the network router element 110(3)). The network router element 110(4) may do the same and provide network router element 110(5) with a label L3 for downstream traffic (towards the network router element 110 (4)) on interface S3. Likewise, the network router element 110(5) may send a label mapping to the edge router element 120(1), and inform edge router element 120(1) to use a label L1 for downstream traffic (toward the network router element 110(5)) on interface S1. Thus, the downstream state for network router element 110(5) may be as follows:

| Incoming | Outgoing |
|---|---|
| L1, S1 | L2, S2 |
|  | L3, S3 |

The above example downstream state shows that, for network router element 110(5), packets in an incoming data stream using a label L1 appearing on interface S1 should be replicated and transmitted on interfaces S2 and S3 using labels L2 and L3, respectively.

During the building of a multipoint-to-multipoint LSP tree, an additional LSP per downstream interface is installed for upstream traffic when the downstream LSP is built. Using the label mapping received from the network router element 110(3), the network router element 110(5) may send network router element 110(3) an upstream label L4 as a reply. The upstream label L4 may be used for upstream traffic sent from the network router element 110(3) to the network router element 110(5). Likewise, an upstream label L5 may be sent by the network router element 110(5) to the network router element 110(4) for upstream traffic of the multipoint-to-multipoint LSP tree. An upstream label L6 may be sent by the edge router element 120(1) to the network router element 110(5) for upstream traffic.

Thus, from the network router element 110(5) to the root edge router element 120(1), similar LSP installation operations may occur. Accordingly, a label mapping including downstream label L1 can be sent from the network router element 110(5) to the edge router element 120(1), and the edge router element 120(1), defining the LSP root, can send an upstream label L6 for upstream traffic. The L6 upstream label can be shared between the two upstream states from the network router elements 110(3) and 110(4), thus permitting both upstream data streams to go to the same root network router element (edge router element 120(1)) via the same path. Thus, the network router element 110(5) may have the following upstream states:

| Incoming | Outgoing |
|---|---|
| L4, S2 | L6, S1 |
| L5, S3 | L6, S1 |

The first example state above (L4, S2 to L6, S1) defines an upstream state wherein a data stream incoming on interface S2 having an upstream label L4 will be directed to interface S1 and will include a label L6. The second example state (L5, S3 to L6, S1) similarly shows an incoming data stream with label L5 arriving on interface S3 will also be directed to interface S1 and with a label L6 inserted. In an example embodiment, instead of using a designated forwarder to forward bidir PIM packets, labels may be used to forward upstream bidir PIM packets.

In an example embodiment, only packets received with an upstream label (label L6 in the given example) are forwarded by the edge router element 120(1) to an example rendezvous point 145. As packets received by the edge router element 120(2), and associated with the LSP tree rooted at edge router element 120(1), will be received on a downstream label (the packets are moving "downstream" relative to the root defined at the edge router network element 120(1)) they will not be forwarded by the edge router element 120(2) to the rendezvous point 145. The abovementioned example upstream states permit data stream packets to travel upstream from a source (e.g., from any one of edge router elements 120(2)-120(4) to the LSP tree root (edge router element 120(1))). Accordingly, in an example embodiment, looping that would otherwise occur in a bidir PIM network in the absence of DFs may be avoided (e.g., eliminated) using LSPs. Thus, in an example embodiment, bidir PIM may be deployed in a network without requiring a DF.

Packets can also be sent down the tree "branches" at intermediate network router elements as data stream packets travel upstream toward the root (bidirectional communication). For example, data stream packets traveling upstream from the network router element 110(3) through the network router element 110(5) would not only be transmitted upstream toward the root network router element 120(1), but would also be replicated and transmitted to the network router elements 110(4) and 110(2). Through such intermediate duplication of the upstream data stream, the multipoint-to-multipoint LSP is not dependent on the root to send the packets back downstream through an intermediate network router element that has previously handled that frame from the network data stream. This can be accomplished by merging the downstream state at the network router element 110(5) with the upstream states. Each upstream state can copy the interfaces from the downstream state, with the exception of the incoming interface for the upstream traffic. The incoming interface is excluded because there is no need to replicate and transmit the data stream packets back toward the data stream's source. As a result, the upstream states on the network router element 110(5) may be as follows:

| Incoming | Outgoing |
|---|---|
| L4, S2 | L6, S1 |
|  | L3, S3 |
| L5, S3 | L6, S1 |
|  | L2, S2 |

For example, an incoming data stream packet having a label L4 arriving at interface S2 will be replicated by the network router element 110(5) and transmitted from interface S1 with an inserted label L6 and transmitted from interface S3 with an inserted label L3. Thus, a full-feature multipoint-to-multipoint LSP tree may be built by creating specific upstream states in combination with merging the downstream state of the outgoing interface list. The LSP tree may then be used to transport bidir PIM over a MPLS-enabled network.

Figure 2:
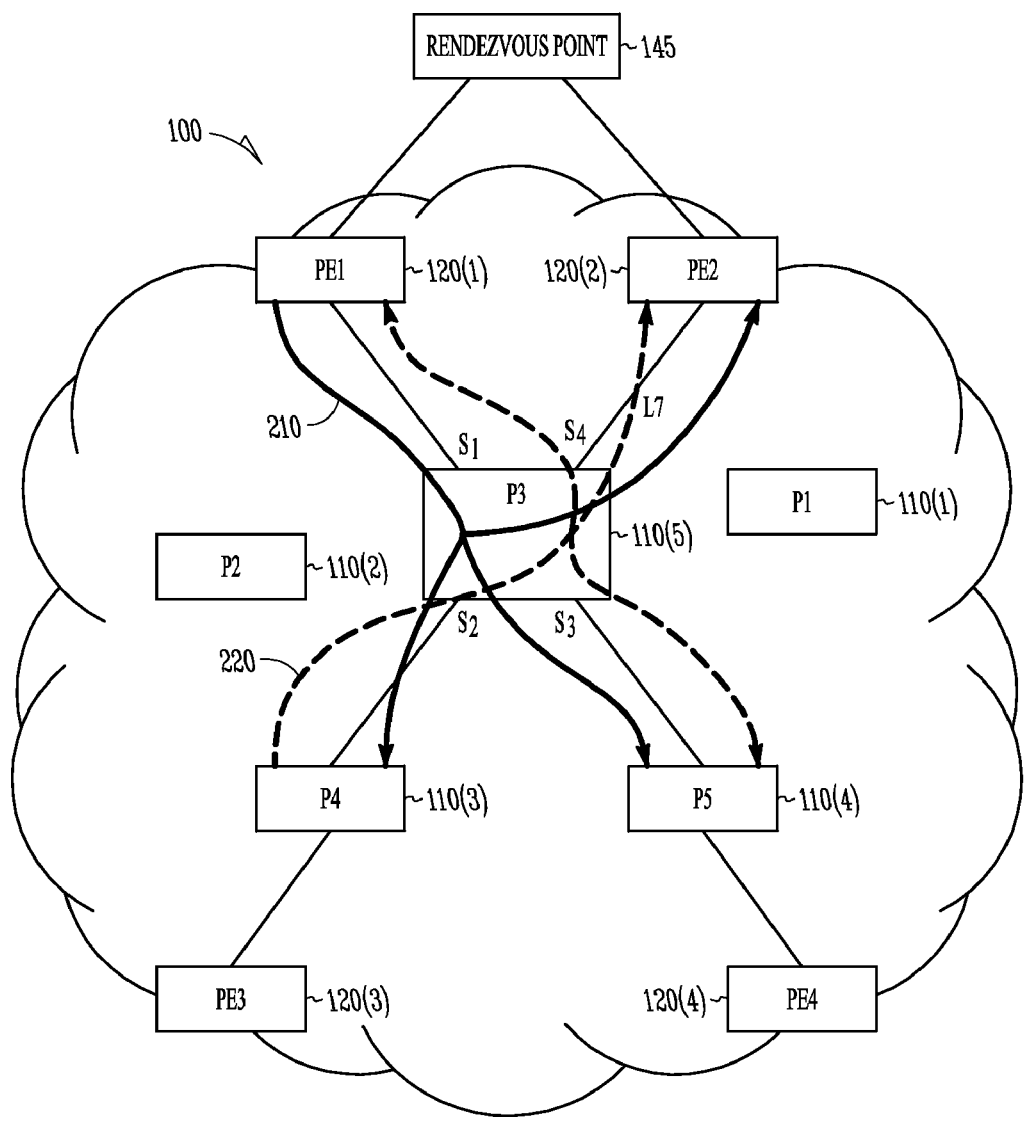
FIG. 2 shows data replication in the provider network of FIG. 1.

FIG. 2 shows an example method of data stream replication in the provider network 100 shown in FIG. 1. In FIG. 2, downstream and upstream data streams are superimposed upon a core of the provider network 100. A downstream data stream 210 is provided to the network router element 110(5) by root edge router element 120(1). Data stream packets are then replicated and transmitted on the interfaces S2 and S3 to the network router elements 110(3) and 110(4), respectively, as well as to edge router element 120(2). An upstream data stream 220 is transmitted from the network router element 110(3) to the network router element 110(5) and received on interface S2. The upstream data stream 220 is then replicated and transmitted to the root network router element 120(1) on interface S1, to the network router element 110(4) on interface S3, and to the edge router 120(2) on interface S4 (using a label L7).

In the example network configuration shown in FIGS. 1 and 2, the edge router element 120(2) is downstream of the root edge router element 120(1) and will thus receive packets with downstream label (e.g., the label L7 on interface S4).

However, in an example embodiment, the edge router elements 120(1)-120(4) are configured so that they only send packets to the RP 145 when they are received with an upstream label. Thus, packets received from the network router element 110(5), and associated with the LSP rooted at edge provider 120(1), will not be sent by the edge router element 120(2) to the RP 145 as they will be received on interface S4 with the downstream label L7. Thus, looping of multicast packets may be avoided.

In an example embodiment, Label Distribution Protocol (LDP) may thus be used to build label switch paths (LSPs) through an MPLS network to allow upstream communication of packets to a RP using bidir PIM.

Figure 3:
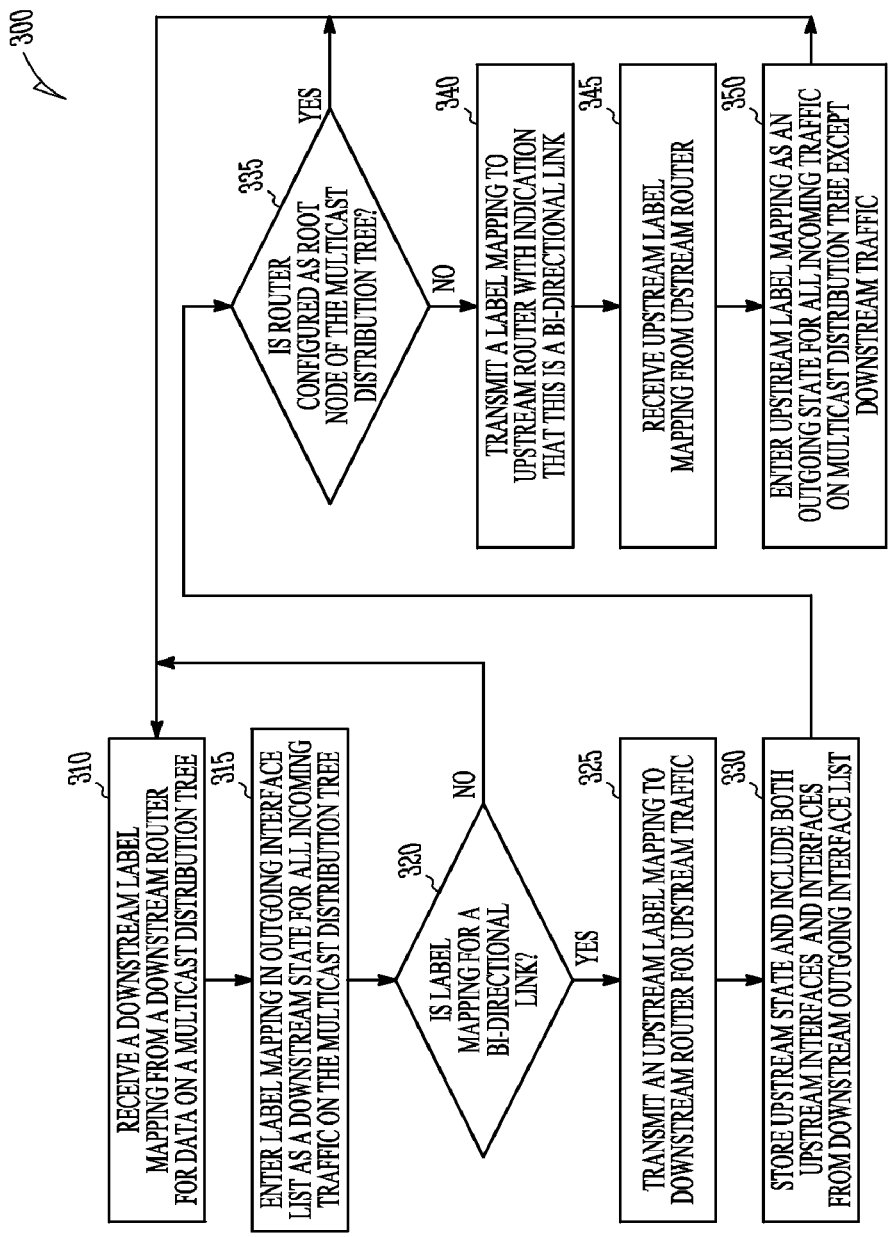
FIG. 3 shows a flow diagram of a method performed by a network router element to route bidirectional (bidir) PIM packets to a Label Switched Path (LSP) rendezvous point.

FIG. 3 shows a flow diagram of a method 300 performed by a core network router element (e.g., network router element 110(3)) to transport bidir PIM over an MPLS network (e.g., the provider network 100). The network router element can receive a downstream label mapping from a downstream router for a data stream carried on an MDT (see block 310). The network router element can then enter the downstream label mapping in an outgoing interface list as a downstream state for all incoming traffic on the indicated MDT (see block 315).

It can then be determined from the LDP message whether the label mapping is for a bidirectional link (e.g., a multipoint-to-multipoint LSP tree) as shown in block 320. If not, then the network router element can return to waiting for other label mappings. If the label mapping is for a bidirectional link, then the network router element can transmit an upstream label mapping for upstream traffic to the downstream router from which it received the downstream label mapping (see block 325). The network router element can then store the upstream state and include both the upstream interface (e.g., S1 on network router element 110(5)) and interfaces from the downstream outgoing interface list (e.g., S3 on network router element 110(5)) (see block 330).

If the network router element is not configured as a root edge router element of the MDT (see block 335), then the network router element can transmit a label mapping to an upstream network router element (e.g., root network router element 120(1)) along with an indication that such a label is for a bidirectional link (see block 340). The network router element will receive an upstream label mapping from the upstream router (see block 345) and enter that upstream label mapping as an outgoing state for all incoming traffic on the multipoint tree, except for downstream traffic entering through the upstream interface (e.g., interface S1 on the network router element 110(5)) (see block 350). In such a manner, both downstream and upstream states described previously may be configured.

Example bidir PIM in Conjunction with LSPs

Figure 4:
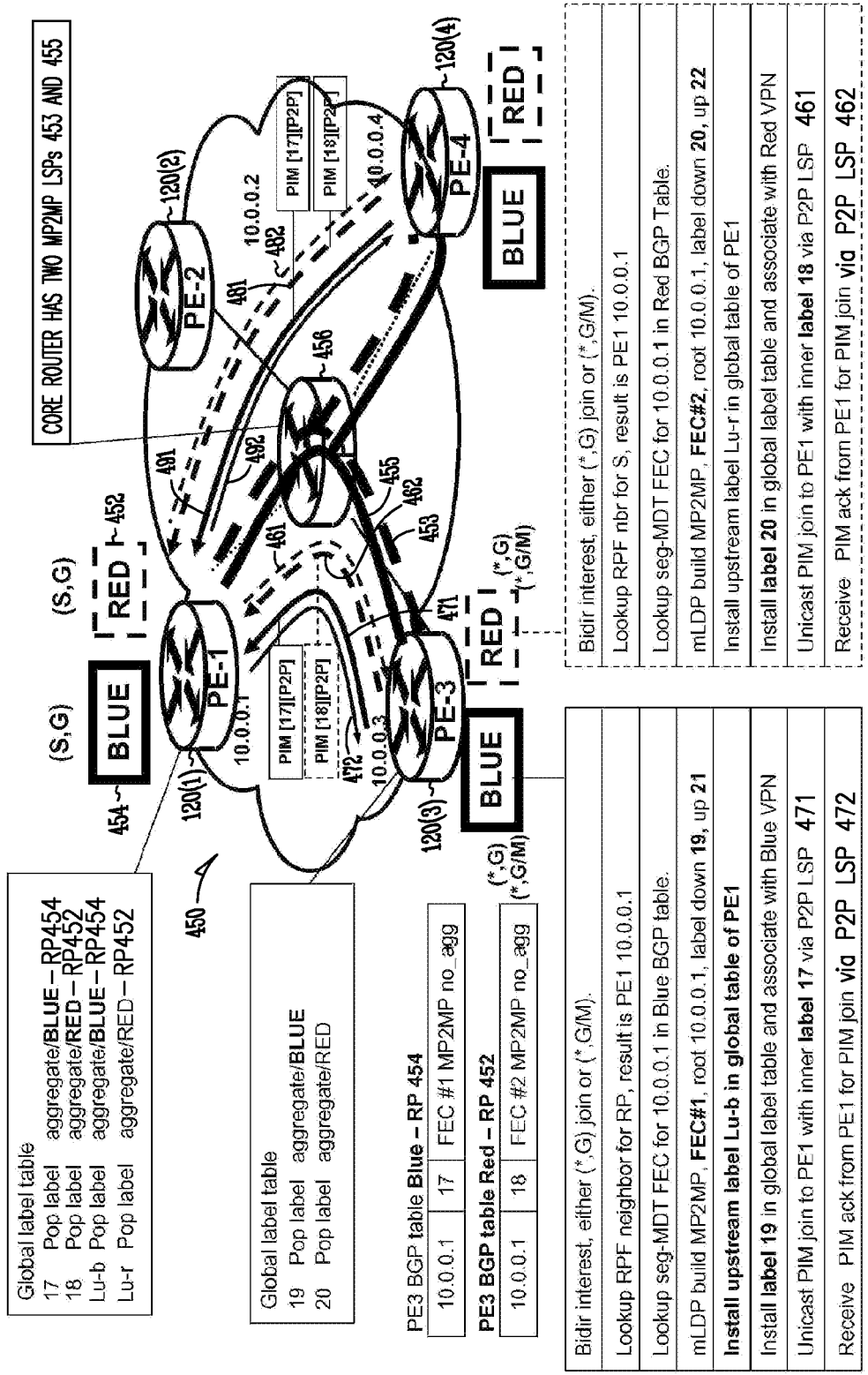
FIG. 4 shows a network, in accordance with an example embodiment, in which bidir PIM is transported using LSPs.

FIG. 4 shows a network 450, in accordance with an example embodiment, in which LSPs are used in conjunction with bidir PIM to provide multipoint-to-multipoint routing over the LSPs. The network elements in the network 450 may correspond to the network elements in the provider network 100 shown in FIGS. 1 and 2 and, accordingly, like reference numerals are used to indicate the same or similar features. In the provider network 450, a multipoint-to-multipoint LSP from the downstream edge router element 120(3) to the upstream edge router element 120(1) is provided using, for example, the methodology and network configuration described above with reference to FIGS. 2 and 3. A first RP 452 ("red RP") and a second rendezvous point 454 ("blue RP") are shown to be behind edge router element 120(1).

In an example embodiment, a unicast route lookup is performed at edge router elements 120(1)-120(4) on the customer RP (the first RP 452 or the second RP 454) and a determination is made to decide which ingress edge router element should be the root of the respective LSP tree. After the root of the LSP tree is determined, the multipoint-to-multipoint tree identifier may be found.

In an example embodiment, the multipoint-to-multipoint tree identifier may have been advertised by the edge router element 120(1) using Border Gateway Protocol (BGP). The multipoint-to-multipoint tree identifier may be referred to as a Forwarding Equivalence Class (FEC). From a downstream perspective it will be noted that the example multipoint-to-multipoint LSP is shown to have two label values. For example, the edge router element 120(3) may assign a label 19 to a core router (P) 456 for the downstream path, and the core router 456 may assign label 21 to the edge router element 120(3) for the upstream path (see FIG. 5). When the edge router element 120(3) is required to send a packet upstream to the second rendezvous point 454, a label value 21 will thus be used. The edge router element 120(3) will receive packets from the LSP tree associated with the second RP 454 that the other edge router elements 120(1), 120(2) and 120(4) send on the LSP tree, on label value 19. Accordingly, downstream traffic may be routed.

Figure 9:
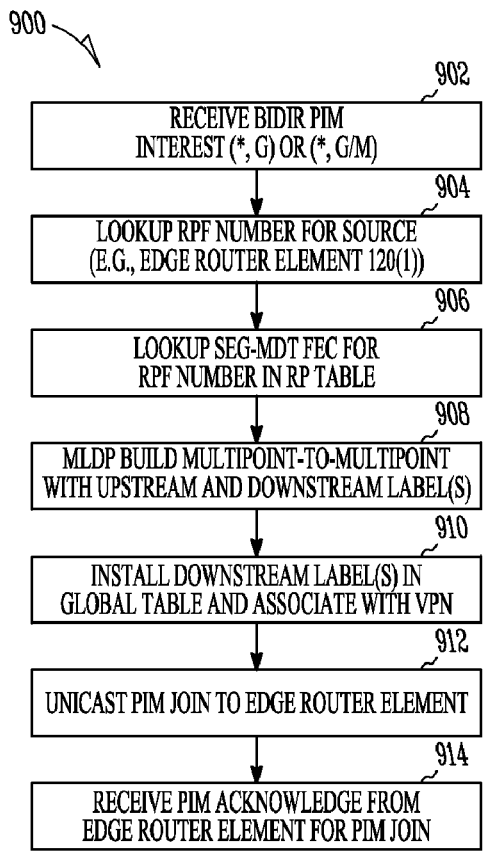
FIG. 9 shows a method, in accordance with an example embodiment, to establish an LSP for transporting bidir PIM in a Multiprotocol Label Switching (MPLS) network.

The core router 456 may also setup a two-way path to the edge router element 120(1). For example, a global label table on the edge router element 120(1) is shown to include upstream labels Lu-r (associated with the RP 452 and a first LSP 453) and Lu-b (associated with the RP 454 and a second LSP 455). The labels Lu-r and Lu-b are thus the upstream labels that the edge router element 120(1) assigns to the core router 456 for the LSPs 453 and 455 respectively. In an example embodiment, the edge router element 120(1) may know it is the root of the multipoint-to-multipoint LSP from multicast LDP (mLDP) label mapping messages that may be used to build the tree and encode the root node address. If an edge router element 120(1)-120(4) receives a label mapping message that includes an address that is owned by that edge router element, it can then identify that it is the root of an LSP tree. A method, in accordance with an example embodiment, to establish LSP for transporting bidir PIM in a MPLS network is shown in FIG. 9.

Figure 5:
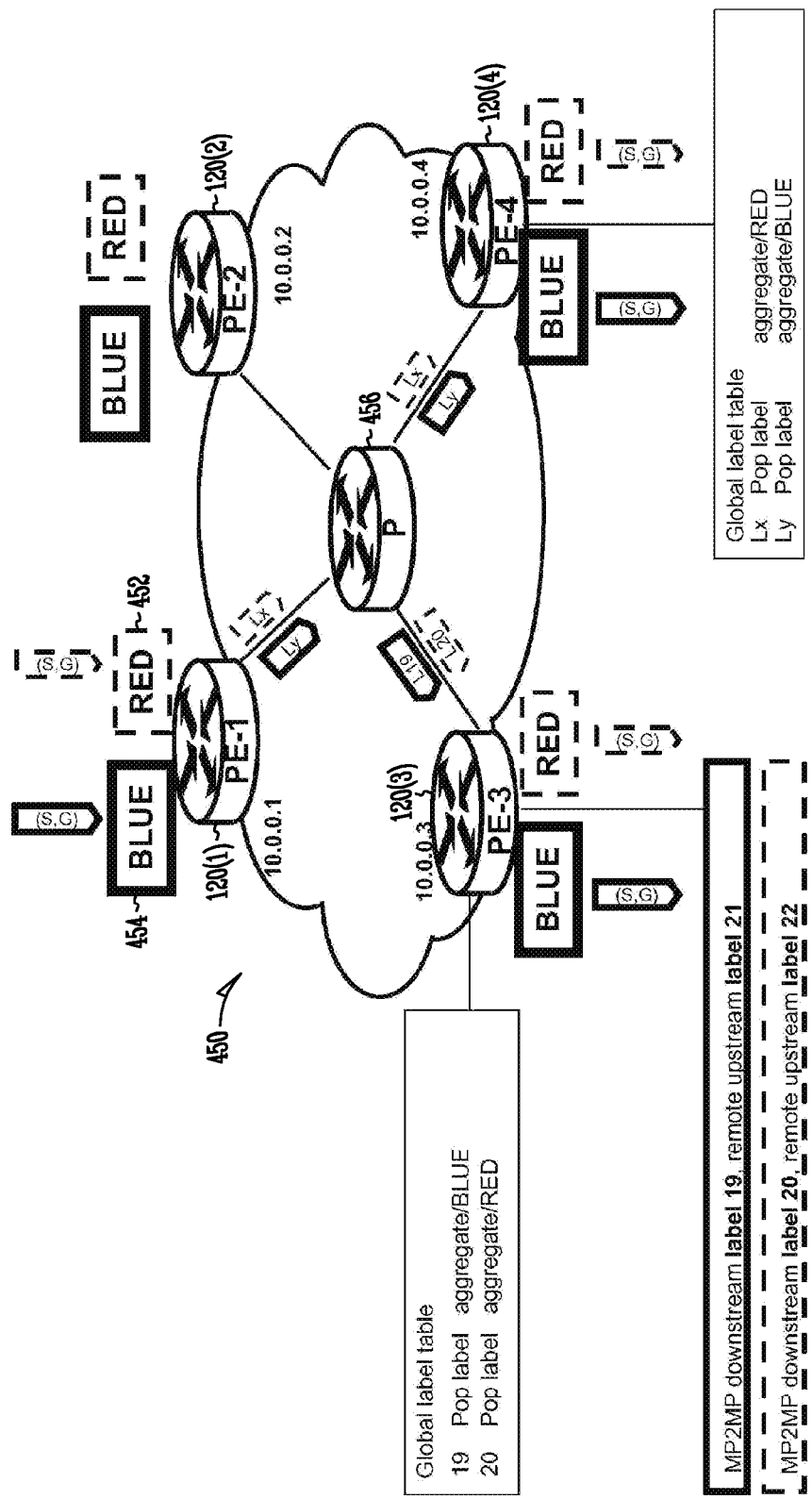
FIG. 5 shows example downstream packet flow in the network shown in FIG. 4.

FIG. 5 shows example downstream packet flow in the provider network 450 shown in FIG. 4. The downstream packets flow from edge router element 120(1), the root of the trees (first and second LSPs 453 and 455), going downstream to the core router 456 where the packets are replicated and forwarded to the edge router elements 120(3) and 120(4). It will be noted that packets received on the edge router element 120(3) are received on the downstream label values. Since the edge router element 120(3) is not the root, it will forward the packets to the customer network (e.g., see customer edge router element 130(2) in FIG. 1). Likewise, the edge router element 120(4) will receive packets with downstream label values and forward them to a customer network (e.g., see customer edge router element 130(4) in FIG. 1).

Figure 6:
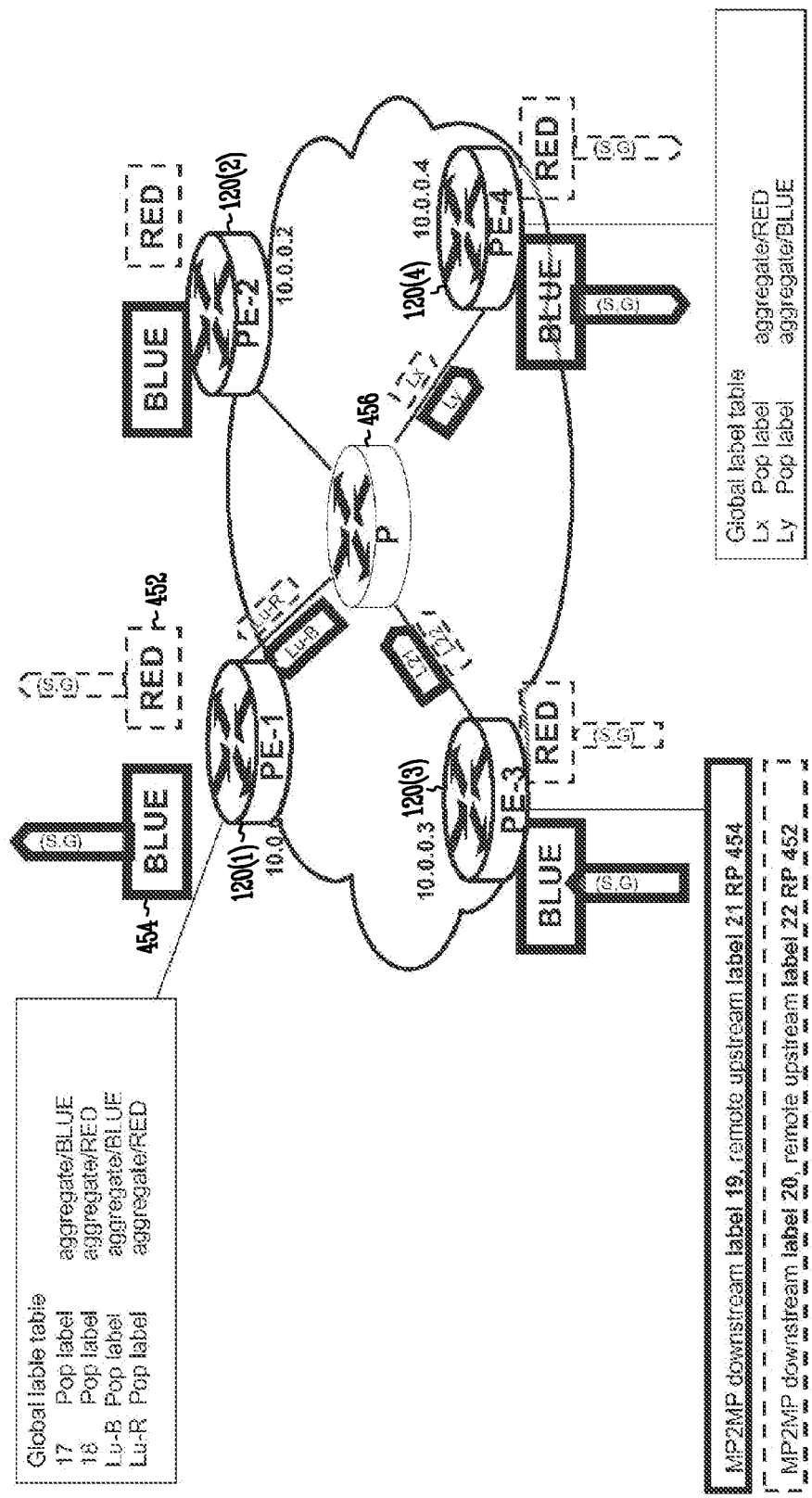
FIG. 6 shows example upstream packet flow in the network shown in FIG. 4.

FIG. 6 shows example upstream packet flow in the provider network 450 shown in FIG. 4. The edge router element 120(3) sends packets upstream to the first and the second RPs 452, 454 located behind the edge router element 120(1) (see for example RP 145 in FIGS. 1 and 2). The packets are shown by way of example as being sent with labels 21 and 22. Packets going upstream to the root (the edge router element 120(1)) are shown to get upstream labels 21 and 22. Since the edge router element 120(1) is in the direction of the root, Lu-r and Lu-b labels are substituted at the core router 456. Packets going downstream to the edge router element 120(4) are shown to get downstream labels Lx and Ly. The edge router element 120(4) will forward packets to the customer (e.g., see customer edge router element 130(4) in FIG. 1) because the edge router element 120(4) is not the root and also because packets are received on a downstream label (label Lx or Ly in the example embodiment). As the edge router element 120(1) is the root in the example embodiment, it will thus forward packets to the customer and the RP (RP 452 or RP 454) because the packets are received on an upstream label at the edge router element 120(1). Thus, the edge router element 120(3) sends a packet on a segmented MDT that is rooted at the edge router element 120(1).

Figure 7:
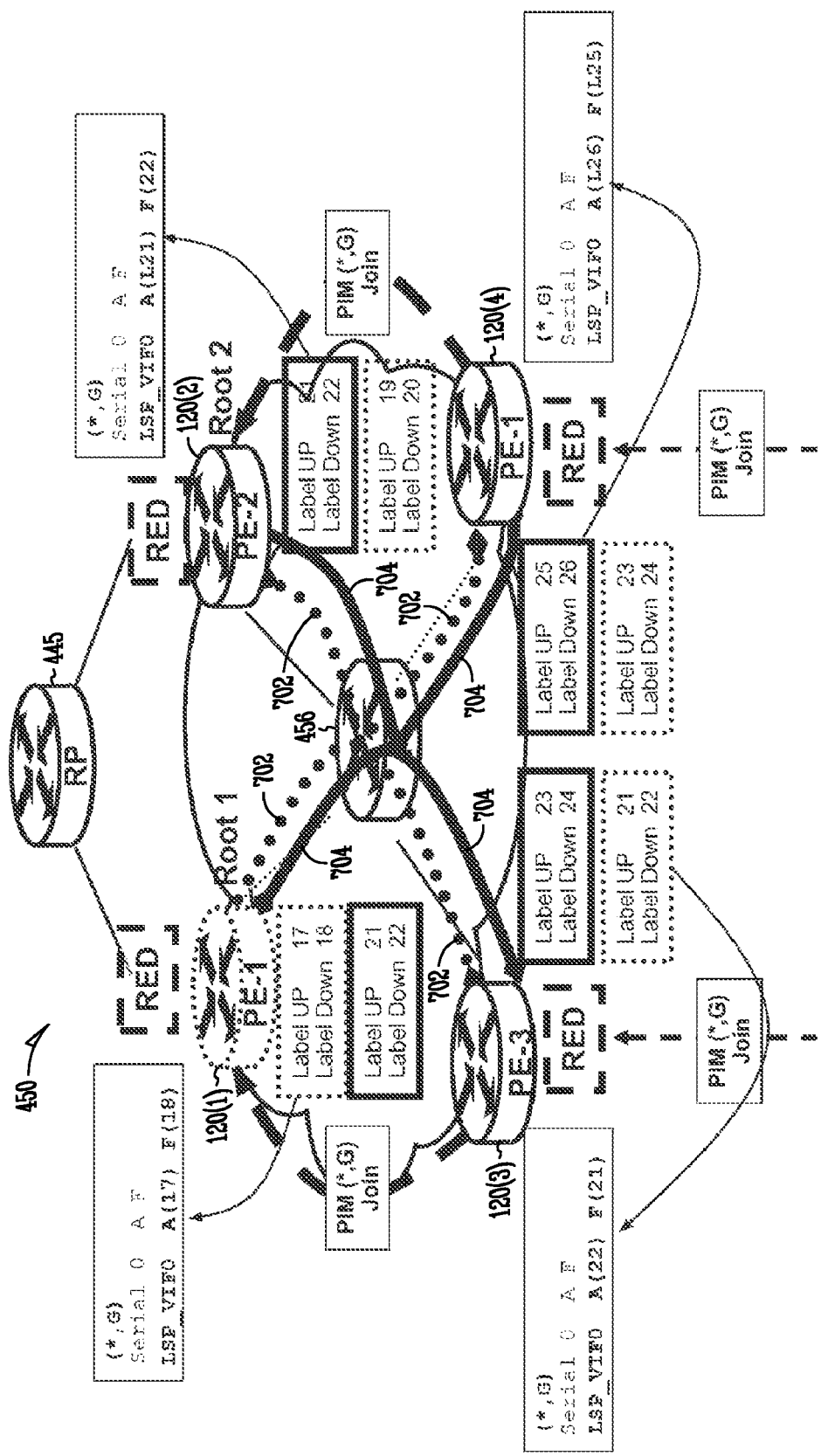
FIG. 7 shows an example network, in accordance with an example embodiment, including two roots and thus two LSPs to transport bidir PIM over an MPLS network.

FIG. 7 shows an example network including two roots and thus two LSPs to transport bidir PIM over an MPLS network. A first LSP 702 is shown to be rooted at edge router element 120(1) ("Root 1") and second LSP 704 is shown to be rooted at edge router element 120(2) ("Root 2"). In FIG. 7, the provider network 450 may receive PIM joins at provider edge router elements 120(3) and 120(4).

The downstream edge router element 120(3) is shown to select the edge router element 120(1) as the root of the first LSP 702, and the edge router element 120(4) is shown to select the edge router element 120(2) as the root of the second LSP 704. In an example embodiment, the multipoint-to-multipoint first and second LSPs 702, 704 may not only be used for bidir PIM, but also other types of multicast traffic, such as (S, G) traffic. Thus, it is possible that the edge router element 120(2) also joins the first LSP 702 to the edge router element 120(2) and the edge router element 120(1), and joins the second LSP 704 to the edge router element 120(2). This may be a worst case scenario, in which packets that are forwarded upstream from the edge router element 120(3) to the edge router element 120(1) are also received by the edge router element 120(2). In the example embodiment, both the edge router element 120(1) and the edge router element 120(2) have a valid path to reach the customer RP, so potentially both could forward packets to the RP 445 causing duplicates and loops. However, in stark contrast to conventional bidir PIM where there would be a DF election between the edge router element 120(1) and the edge router element 120(2), the example network 450 uses the upstream and downstream labels to avoid election of a DF. FIG. 7 shows example upstream and downstream label assignments for each edge router element 120(1)-120(4) for the first and second LSPs 702, 704. In the example embodiment shown in FIG. 7, as the edge router element 120(1) is shown to be the root of the LSP 702 it is configured to only accept packets on an upstream label (see label 17). Packets to be forwarded down the LSP 702 are shown by way of example to use label 18.

The (*, G) notation may represent a customer IP bidir PIM state. LSP-VIF is an example interface that is shown to be used to connect a customer IP network to the provider network 450. The notation "A" is shown by way of example to identify acceptance of packets and the notation "F" to identify forwarding of packets. In an example bidir PIM network, acceptance and forwarding of packets may be accomplished using the same interface. Acceptance and forwarding of packets in the bidir PIM enabled network router element may thus depend on the direction the packet is traveling relative to a root of a LSP.

The same functionality may apply to the edge router element 120(2). Because the edge router element 120(2) is the root of the LSP 704, packets are accepted with label 21 (upstream label A (L21)) and forwarded using a downstream label 22 (downstream label F (22)). The edge router element 120(2) will also receive packets that are forwarded upstream by the edge router element 120(3) on the LSP 702 (e.g., they will arrive using label 20). However, the edge router element 120(2) will not forward them upstream using the (*, G) state because it expects the packets to arrive on a different label, namely label 21 (as opposed to label 17 on the edge router element 120(1)).

The edge router element 120(4) will also receive packets on the LSP 702, but since it selected the edge router element 120(2) as the root, it will only accept packets on the downstream label (downstream label 26) of the LSP 704. This may be termed a strong Reverse Path Forward (RPF) check on the label values. Thus, in an example embodiment, based on the role of the edge router element 120(1)-120(4) being root or not a root of a LSP, the packets on the upstream or downstream label may be accepted.

Figure 8:
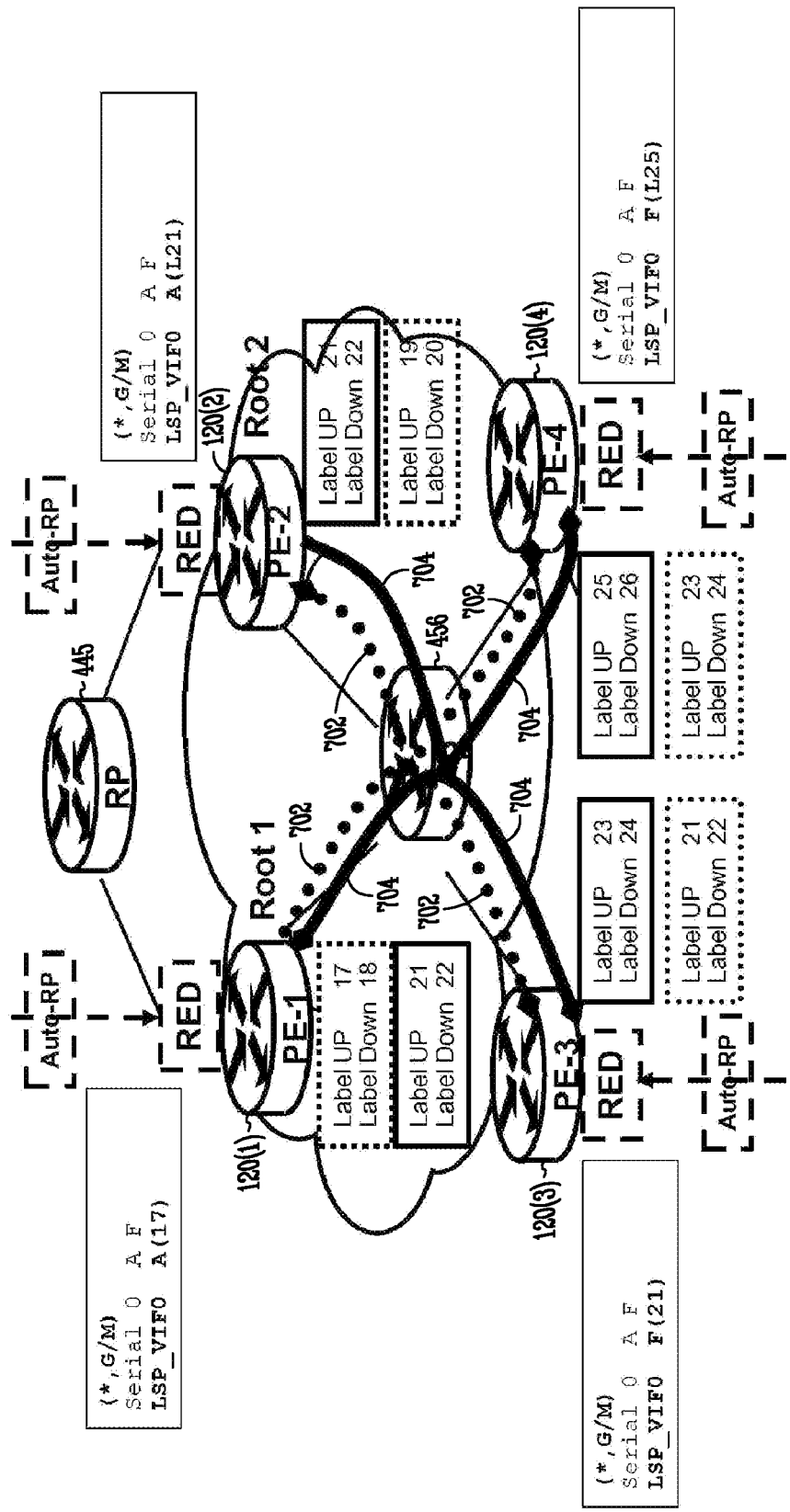
FIG. 8 shows further functionality that may be included in the network of FIG. 7.

FIG. 8 shows further functionality that may be included in the network 450 of FIG. 7. With bidir PIM it is possible to be a sender into an LSP tree without being a receiver. FIG. 8 shows example methodology to set up a sender path only using an upstream accepting label. In an example embodiment, a special (*, G/M) state is built, which forwards all groups that match "G/M" to the customer RP 445. This state may be populated by Auto-RP (automatic RP) functionality. Auto-RP is a protocol to distribute mapping information between the customer RP 445 and a multicast group address. In the example embodiment, the edge router elements 120(1) and 120(2) are configured to only accept packets to be forwarded to the customer RP 445 and there is no downstream path to forward packets on.

FIG. 9 shows a method 900, in accordance with an example embodiment, to establish an LSP for transporting bidir PIM in an MPLS network. The method 900 may be used to establish the example first and second LSPs 453 and 455 described above with reference to the provider network 450 (see FIG. 4). For ease of explanation, the method 900 is described with reference to the LSP 453 and to a label mapping received from network router element 120(3).

As shown at block 902, the method 900 may receive a bidir PIM interest, either (*,G) join or (*,G/M). Thereafter an RPF number for the source is looked up (see block 904). For example, in the provider network 450 the RPF number is shown to correspond with edge router element 120(1) with RPF number (10.0.0.1). Once the RPF number is obtained, as shown at block 906, a lookup for a segmented MDT FEC for 10.0.0.1 is performed in a BGP table associated with the first RP 452. An mLDP build multipoint-to-multipoint is then performed. With respect to the example first LSP 453 the following build may be performed: FEC#2, root 10.0.0.1, label down 20, up 22 for the example provider network 450. As shown in block 910, a downstream label(s) may then be installed in a global label table. The downstream label may then be associated with a VPN. For example in the first LSP 453, an upstream label Lu-r may be installed in a global table of edge router element 120(1). For example, the method 900 may install label 20 in a global label table of network router element 120(3) and associated with the first LSP 453 and thus with a VPN associated with the LSP 453. A unicast PIM join to the provider edge router element (e.g., edge router element 120(1)) may then be processed (see block 912). For example the unicast join may have an inner label 18 and be unicast via point-to-point (P2P) LSP 461. As shown at block 914, a PIM acknowledgement (ack) for the PIM join may then be received from the provider edge router (e.g., the edge router element 120(1)) by edge router 120(3) over P2P LSP 462. A similar process may be used to establish the example first and second LSPs 453 and 455 for a label mapping received from network router element 120(4), using unicast point-to-point (P2P) LSPs 481/491 to transmit the joins and using P2P LSPs 482/492 to transmit the acks. In example embodiments, instead of unicast PIM messages, PIM over Transmission Control Protocol (TCP) or PIM and BGP signaling may be used.

Figure 10:
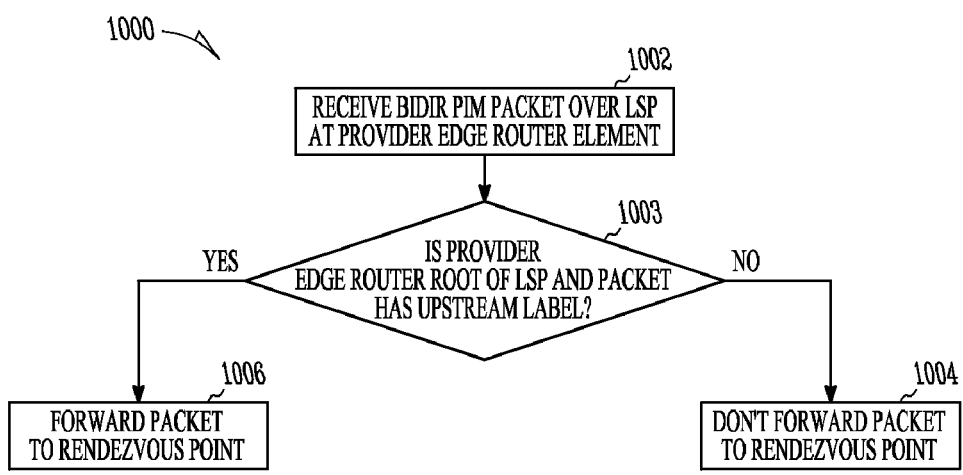
FIG. 10 shows a method, in accordance with an example embodiment, to transport bidir PIM over a MPLS network.

FIG. 10 shows a method 1000, in accordance with an example embodiment, to transport bidir PIM over a MPLS network. The method 1000 may be performed at an edge router element at which an LSP tree is rooted.

As shown at block 1002, a bidir PIM packet may be received over a Label Switched Path (LSP) at a provider edge router element (e.g., provider edge router 120(1) of a provider network e.g., provider network 450). The method 1000 may identify if the provider edge router element is a root of the LSP and identify a packet label of the received bidir PIM packet (see block 1003). If the provider edge router element is not the root of the LSP, the method 1000 does not forward the packet to an RP (see block 1004). However, if the provider edge router element is the root of the LSP and the label is an upstream label, the packet is forwarded to the RP (see block 1006).

In an example embodiment, an LSP (e.g., P2MP or MP2MP) may be built per ingress provider edge router providing a segmented-MDT (seg-MDT). Multiple VPN's may be aggregated over a seg-MDT tree and each ingress provider edge router may allocate a label per VPN. In an example embodiment, this "upstream" label is unique in the context of the seg-MDT.

In an example embodiment utilizing Auto-RP, one MI-PMSI (Multi Inclusive Provider Multicast Service Interface) may be provided for an Auto-RP/BSR and PIM neighborhood. A segmented MDT may be a point-to-point or multipoint-to-multipoint LSP.

In an example embodiment, a segmented MDT has only one ingress provider edge router, which is the root of the LSP tree. Because there is one ingress provider edge router, no duplicate forwarders exist, and thus no PIM asserts. Further as there may be a single provider edge router, one upstream path to the RP is provided, so no DF election is required. The ingress provider edge router may perform explicit tracking of PIM joins, and join/prune overrides are not required. In an example embodiment, PIM joins/prunes are acknowledged.

In an example embodiment, VPN labels are unique on the ingress provider edge router. VPN labels may be unique in the context of the seg-MDT LSP on the egress provider edge router. In an example embodiment, the ingress provider edge router may impose a VPN label in the packet when the VPNs are aggregated over a single seg-MDT.

Egress provider edge routers may do context based lookups using a seg-MDT label and a VPN label. The VPN label may identify a multicast forwarding information base (MFIB) table for IP lookup. In an example embodiment where a seg-MDT per VPN is built, there may be no need for the VPN labels in the packet (but labels may still be used for upstream signaling).

In an example embodiment, a seg-MDT may be created per ingress provider edge router per VPN. The ingress provider edge router may signal in BGP different FEC for its connected VPNs. The ingress provider edge router may decide an aggregation policy.

In an example embodiment, two PIM signaling options may be provided. Point-to-point LSPs may be provided using the ingress provider edge VPN label or in-band over the multipoint-to-multipoint LSP. The ingress provider edge router may assign different FECs per VPN. The egress provider edge router may build two multipoint-to-multipoint LSPs across a network core.

In an example embodiment, for a (*,G) join received on a c-VPN interface, the ingress provider edge router towards RP may be found. A LSP_VIF may be installed for that VPN in (*,G) and a multipoint-to-multipoint tree may be setup (joined) to the ingress provider edge router. In this example embodiment acceptance may then be on a downstream label on the tree to ingress provider edge router. Forwarding is then on an upstream label on the tree to an ingress provider edge router. Acceptance and forward functionality may be provided on other IP VPN interface(s).

For a (*,G) join received over a MPLS core (PIM or BGP), for a unicast PIM join, the VPN label may set the correct context pointing the PIM join to the right LSP VIF (e.g., for BGP use import Route Target (RT)). In an example embodiment, an accepting upstream label is installed for this (*,G), but only if the RP is not resolved over this LSP_VIF. Acceptance may be on an upstream label from a tree for which the provider edge router is the root. Forwarding may be on a downstream label on a tree for which the provider edge router is the root.

In an example embodiment including a sender only branch, if the RP resolves over an MPLS cloud, an ingress provider edge router is found. A MP2MP tree setup or join for which the ingress provider edge router is root may be performed, and an associated LSP_VIF may be found. The LSP_VIF on (*,G/M) may then be installed. In these example circumstances, forwarding may then be on an upstream label. Acceptance may be on all other interfaces. In an example embodiment, there is no accept on downstream label. If RP resolves over a VPN interface, accepting may be on an upstream label for a tree for which the provider edge router is the root and on all VPN interfaces. Forwarding may be on an interface towards the RP.

Figure 11:
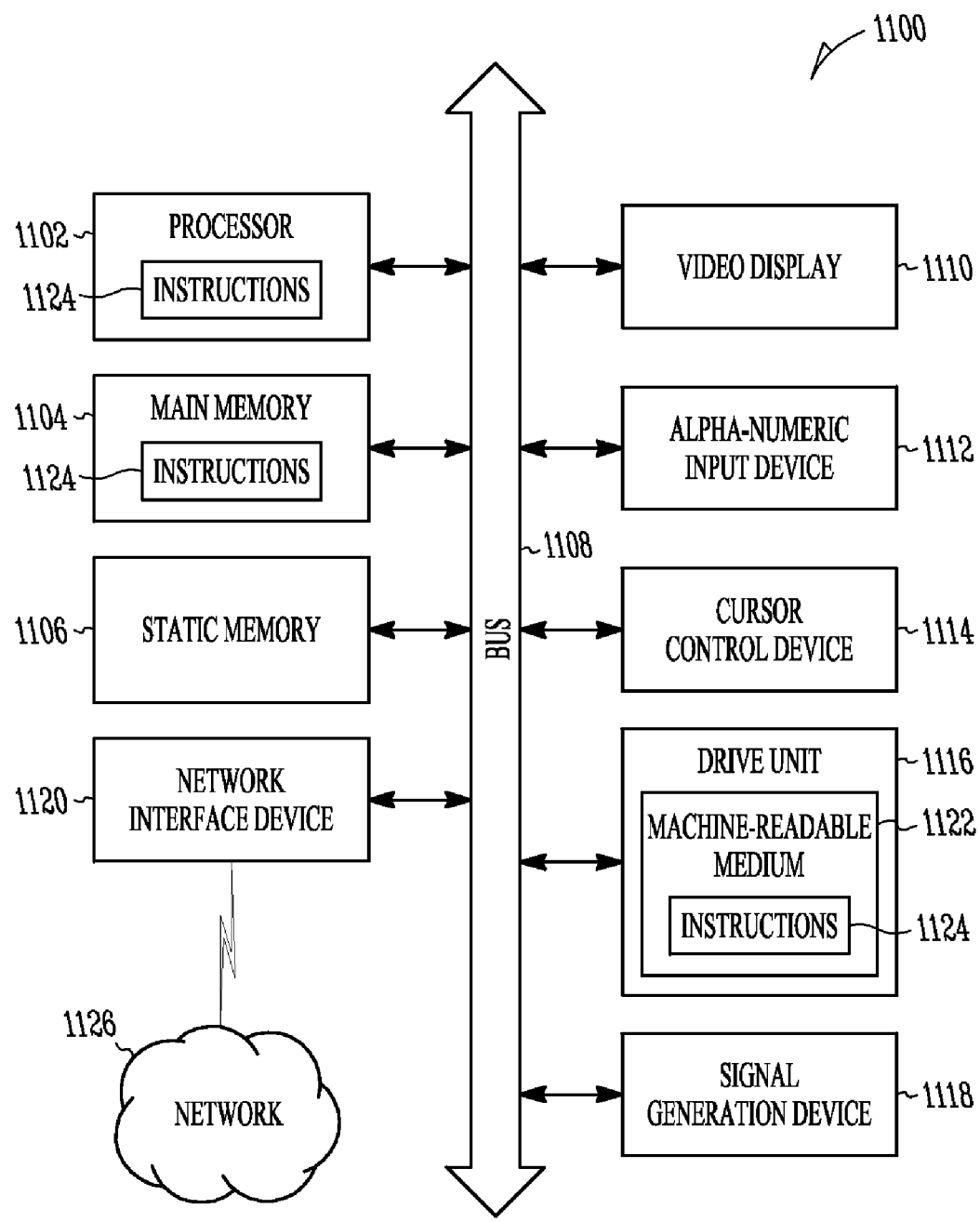
FIG. 11 shows a diagrammatic representation of a machine in the example form of a computer system within which a set of instructions, for causing the machine to perform any one or more of the methodologies discussed herein, may be executed.

FIG. 11 shows a diagrammatic representation of a machine in the example form of a computer system 800 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD), plasma display, or a cathode ray tube (CRT)). The computer system 1100 also includes an alphanumeric input device 1112 (e.g., a keyboard), a user interface (UT) navigation device 1114 (e.g., a mouse), a disk drive unit 1116, a signal generation device 1118, and a network interface device 1120.

The disk drive unit 1116 includes a machine-readable medium 1122 on which is stored one or more sets of instructions and data structures (e.g., software 1124) embodying or used by any one or more of the methodologies or functions described herein. The software 1124 may also reside, completely or at least partially, within the main memory 1104 and/or within the processor 1102 during execution thereof by the computer system 1100, the main memory 1104 and the processor 1102 also constituting machine-readable media.

The software 1124 may further be transmitted or received over a network 1126 via the network interface device 1120 using any one of a number of well-known transfer protocols (e.g., FTP).

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the example embodiments, or that is capable of storing, encoding, or carrying data structures used by or associated with such a set of instructions. The term "machine-readable medium" shall accordingly be taken to include, but not be limited to, solid-state memories, optical and magnetic media, and carrier wave signals.

The computer 1100 may be programmed to perform the functionality of the network router elements 120(1-4) and/or 110(1)-110(5).

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    receiving a multicast packet at a network element of a plurality of network elements in a network, the multicast packet including an upstream label or a downstream label;
    identifying, from the upstream label, a Multicast Distribution Tree (MDT) rooted at a rendezvous point (RP);
    only forwarding the multicast packet along the MDT towards the RP based on the upstream label;
    avoiding electing a designated forwarder from the plurality of network elements;
    performing a route lookup at each of a plurality of edge router elements of the network;
    selecting two of the plurality of edge router elements as roots of respective first and second Label Switched Paths of a second MDT based on the lookup; and
    the two root edge router elements accepting only packets with an upstream label, and only forwarding the packets towards the RP.

2. The method of claim 1, further comprising:
    identifying the MDT from the downstream label; and
    forwarding the multicast packet along the MDT away from the RP based on the downstream label.

3. The method of claim 1, wherein the multicast packet is a bidirectional Protocol Independent Multicast (bidir PIM) packet.

4. The method of claim 1, further comprising building the MDT using a Label Switched Path (LSP) rooted at an ingress provider edge router element in a network.

5. The method of claim 1, wherein the MDT is a point-to-multipoint (P2MP) LSP or a matipoint-to-multipoint (MP2MP) LSP.

6. The method of claim 1, wherein the MDT tree extends from an ingress provider edge router element in a network to the RP to form a segmented MDT.

7. The method of claim 1, further comprising creating two downstream states and multiple upstream states at provider edge router elements of a network, wherein each provider edge router element acts as a label switched router configured to forward packets based on an upstream label or a downstream label included in each of the forwarded packets, and wherein a provider edge router element having one of the downstream states but that is not a root of an LSP tree accepts only packets with a downstream label.

8. The method of claim 1, further comprising aggregating Multiple Private Networks (VPNs) over the MDT, and wherein an ingress provider edge router element allocates a label per VPN.

9. An apparatus comprising:
    memory to store instructions; and
    a processor configured to execute the instructions to:
        receive a multicast packet at a network element of a plurality of network elements in a network, the multicast packet including an upstream label or a downstream label;
        identify, from the upstream label, a Multicast Distribution Tree (MDT) rooted at a rendezvous point (RP);
        only forward the multicast packet along the MDT towards the RP based on the upstream label;
        avoid, electing a designated, forwarder from the plurality of network elements;
        perform a route lookup at each of a plurality of edge router elements of the network; and
        select one of the plurality of edge router elements as the root of an LSP tree of a second MDT based on the lookup.

10. The apparatus of claim 9, wherein the MDT is identified from the downstream label and the multicast packet is forwarded along the MDT away from the RP based on the downstream label.

11. The apparatus of claim 9, wherein the multicast packet is a bidirectional Protocol Independent Multicast (bidir PIM) packet.

12. The apparatus of claim 9, wherein the MDT is built using a Label Switched Path (LSP) rooted at an ingress provider edge router element in a network.

13. The apparatus of claim 9, wherein the MDT is a point-to-multipoint (P2MP) LSP or a multipoint-to-multipoint (MP2MP) LSP.

14. The apparatus of claim 9, wherein the MDT tree extends from an ingress provider edge router element in a network to the RP to form a segmented MDT.

15. The apparatus of claim 9, wherein the instructions cause the processor to create one downstream state and multiple upstream states at provider edge router elements of a network, wherein each provider edge router element acts as a label switched router configured to forward packets based on the upstream label and downstream labels.

16. The apparatus of claim 9, wherein the instructions cause the processor to aggregate Multiple Virtual Private Networks (VPNs) over the MDT, and wherein an ingress provider edge router element allocates a label per VPN.

17. An apparatus comprising:
    means for receiving a multicast packet at a network element of a plurality of network elements in a network, the multicast packet including an upstream label or a downstream label;
    means for identifying, from the upstream label, a Multicast Distribution Tree (MDT) rooted at a rendezvous point (RP);
    means for only forwarding the multicast packet along the MDT towards the RP based on the upstream label; and
    means to avoid electing a designated forwarder from the plurality of network elements;
    means for performing a route lookup at each of a plurality of edge router elements of e network, and
    means for selecting one of the plurality of edge router elements as a root of an LSP tree of a second MDT based on the lookup.

18. A method comprising:
    receiving a multicast packet at a network element of a plurality of network elements in a network, the multicast packet including an upstream label or a downstream label;
    identifying, from the upstream label, a Multicast Distribution Tree (MDT) rooted at a rendezvous point (RP);
    only forwarding the multicast packet along the MDT towards the RP based on the upstream label;
    avoiding electing a designated forwarder from the plurality of network elements;
    receiving a bidir PM interest on a VPN interface of a provider edge router element;
    performing a unicast route lookup on the RP and selecting an ingress provider edge router element as a root of the MDT;
    identifying a multipoint-to-multipoint tree identifier from the root of the MDT; and
    using the multipoint-to-multipoint tree identifier as a Forwarding Equivalence Class (FEC).

19. The method of claim 18, further comprising:
    looking up a reverse path forward neighbor for the RP;
    building the MDT;
    installing the upstream label in a global table of the provider edge router element; and
    unicasting a PIM join to a router element associated with the RP.

20. An apparatus comprising:
    memory to store instructions; and
    a processor configured to execute the instructions to:
    receive a multicast packet at a network element of a plurality of network elements in a network, the multicast packet including an upstream label or a downstream label;
    identify, from the upstream label, a Multicast Distribution Tree (MDT) rooted at a rendezvous point (RP);
    only forward the multicast packet along the MDT towards the RP based on the upstream label;
    avoid electing a designated forwarder from the plurality of network elements;
    receive a bidir PIM interest on a VPN interface of a provider edge router element;
    perform a unicast route lookup on the RP and selecting an ingress provider edge router element as a root of the MDT;
    identify a multipoint-to-multipoint tree identifier from the root of the MDT; and
    use the multipoint-to-multipoint tree identifier as a Forwarding Equivalence Class (FEC).

21. The apparatus of claim 20, wherein the instructions cause the processor to:
    look up a reverse path forward neighbor for the RP;
    build the MDT;
    install the upstream label in a global table of the provider edge router element; and
    unicast a PIM join to a router element associated with the RP.

* * * * *